United States Patent [19]
Reber et al.

[11] Patent Number: 5,903,729
[45] Date of Patent: May 11, 1999

[54] METHOD, SYSTEM, AND ARTICLE OF MANUFACTURE FOR NAVIGATING TO A RESOURCE IN AN ELECTRONIC NETWORK

[75] Inventors: William L. Reber, Schaumburg, Ill.; Cary D. Perttunen, Shelby Township, Mich.

[73] Assignee: Motorola, Inc., Schaumburg, Ill.

[21] Appl. No.: 08/890,140

[22] Filed: Jul. 10, 1997

Related U.S. Application Data

[63] Continuation-in-part of application No. 08/710,820, Sep. 23, 1996, application No. 08/726,004, Oct. 4, 1996, application No. 08/732,956, Oct. 17, 1996, and application No. 08/744,338, Nov. 7, 1996.

[51] Int. Cl.$^6$ .................................................... G06F 15/16
[52] U.S. Cl. ............................... 395/200.49; 395/200.47
[58] Field of Search ....................... 395/200.47, 200.48, 395/200.49, 200.76, 200.57, 335, 356.357, 154, 155

[56] References Cited

U.S. PATENT DOCUMENTS

| | | | |
|---|---|---|---|
| 4,841,132 | 6/1989 | Kajitani et al. | 235/472 |
| 4,937,853 | 6/1990 | Brule et al. | 379/96 |
| 5,115,326 | 5/1992 | Burgess et al. | 358/440 |
| 5,156,898 | 10/1992 | McDonald | 428/100 |
| 5,398,336 | 3/1995 | Tantry et al. | 395/600 |
| 5,414,252 | 5/1995 | Shinoda et al. | 235/463 |
| 5,420,943 | 5/1995 | Mak | 382/313 |
| 5,625,781 | 4/1997 | Cline et al. | 395/335 |
| 5,640,193 | 6/1997 | Wellner | 348/7 |
| 5,821,513 | 10/1998 | O'Hagan et al. | 235/383 |

FOREIGN PATENT DOCUMENTS

WO 97/01137  1/1997  WIPO .

OTHER PUBLICATIONS

AC$E Bar Code Information http://www.intrepid.net/N scanlite/page two.html, Apr. 12, 1996.
"Web Users Save Work, Head for Bars," The Nikkei Weekly, p. 9, Jun. 16, 1997.
Article from the Internet: Web TV, author Chris O'Malley, pp. 49–53.
From the Internet: Discover the World Wide Web with Your Sportster, Second Edition, author Neil Randall.
From the Internet: "Advertising" p. 1 of 1, Community ConneXion, Inc., Copyright 1995–1996.
From the Internet: "The Anonymizer FAQ" p. 1 to 5, Community ConneXion, Inc., Copyright 1995–1996.

*Primary Examiner*—Mehmet B. Geckil
*Attorney, Agent, or Firm*—James E. Gauger

[57] ABSTRACT

A method of navigating an electronic network includes steps of reading a list of at least one resource in an electronic network, displaying at least a portion of the list, receiving a user-initiated selection of a resource from the list, linking to the resource upon receiving the user-initiated selection, removing the resource from the list. An article of manufacture directs a system for navigating an electronic network to perform the above-listed steps.

21 Claims, 7 Drawing Sheets

METHOD, SYSTEM, AND ARTICLE OF MANUFACTURE FOR NAVIGATING TO A RESOURCE IN AN ELECTRONIC NETWORK

RELATED APPLICATIONS

The present application is a continuation-in-part of the following applications:

"Electronic Network Navigation Device and Method for Linking to an Electronic Address Therewith", having Ser. No. 08/710,820, filed Sep. 23, 1996;

"Methods and Systems for Providing a Resource in an Electronic Network", having Ser. No. 08/726,004, filed Oct. 4, 1996;

"An Apparatus for Reading an Electronic Network Navigation Device and a Peripheral for Use Therewith", having Ser. No. 8/732,956, filed Oct. 17, 1996; and "Method, System, and Article of Manufacture for Producing a Network Navigation Device", having Ser. No. 08/744,338, filed Nov. 7, 1996.

The subject matter of the above-identified related applications is hereby incorporated by reference into the disclosure of this invention.

FIELD OF THE INVENTION

The present invention relates to methods and systems for navigating to a resource in an electronic network.

BACKGROUND OF THE INVENTION

The introductory chapter of *Discover the World Wide Web with Your Sportster*, Second Edition, provides a perceptive commentary on the present state of the Internet and the World Wide Web. Here, it is stated that the Internet is in need of an application which will transform the "much-hyped but difficult-to-use linking of computers around the world to being a highly informative, highly usable database and communications tool." It is further stated that the various available Web browsers (e.g. Mosaic and Netscape Navigator) all have difficulties and limitations which make them insufficient to handle the complexity of the Internet.

Part of the problem is in the complexity of addressing a resource on the World Wide Web. The World Wide Web uses an addressing system known as a URL (Uniform Resource Locator) that defines the location of a resource on the Internet. URLs are comprised of up to four parts: a protocol, a domain name, a path, and a filename. The combination of these four parts can produce a complex address for a resource. For example, the address for information on two-way pagers on the Motorola home page is: http://www.mot.com/MIMS/MSPG/Products /Two-way/tango/desc.html.

The popularity of the Internet and the World Wide Web has spawned a number of Web-related periodicals. One such periodical is *Yahoo! Internet Life*, which provides reviews of Web sites. This periodical includes a tear-out address guide having URLs for the reviewed Web sites. To link to a Web site of interest, an end user types into his/her computer a URL printed on the guide. Scientific American is another example of a periodical having a page of URLs. The aforementioned complexity of addressing on the World Wide Web can result in the end user typing a lengthy URL to navigate to a Web site of interest.

The end user may read all or a portion of the periodical before linking to any Web site of his/her interest. For example, the end user may read the periodical at a location distant from a computer or a like network navigation apparatus with which to link to the Web stite of interest. Further, an end user may find from the periodical a plurality of Web sites of his/her interest. In these cases, the end user, when located at the computer, can link to a first Web site of interest by manually entering a first URL from the guide. Thereafter, the end user can link to a second Web site of interest by manually entering a second URL from thief guide. This step can be repeated for other Web sites of his/her interest from the guide.

SUMMARY OF THE INVENTION

The present invention relates to electronic network navigation methods and apparatus and articles of manufacturing for use with the electronic network navigation apparatus. One method in accordance with the present invention includes the steps of forming an electronic image of an object having a plurality of markable regions associated wish a plurality of electronic resources, and processing the electronic image to detect which of the markable regions associated with the plurality of electronic resources is marked and which of the markable regions associated with the plurality of electronic resources is unmarked. The method also includes the steps of generating a list comprising at least one link to at least one of the electronic resources whose associated markable region is marked, the list being absent of at least one link to at least one of the electronic resources whose associated markable region is unmarked, and displaying a display screen based upon the list.

One apparatus in accordance with the present invention includes an optical imaging reader to form an electronic image of an object having a plurality of markable regions associated with a plurality of electronic resources. A processor processes the electronic image to detect which of the markable regions associated with the plurality of electronic resources is marked and which of the markable regions associated with the plurality of electronic resources is unmarked. A display device operatively associated with the processor displays a display screen comprising at least one link to at least one of the electronic resources whose associated markable region is marked. The display screen is absent of at least one link to at least one of the electronic resources whose associated markable region is unmarked.

One article of manufacture in accordance with the present invention includes computer-readable data stored by the computer-readable storage medium. The computer-readable data directs an electronic network navigation apparatus to form an electronic image of an object having a plurality of markable regions associated with a plurality of electronic resources, to process the electronic image to detect which of the markable regions associated with the plurality of electronic resources is marked and which of the markable regions associated with the plurality of electronic resources is unmarked, and to display a display screen comprising at least one link to at least one of the electronic resources whose associated markable region is marked. The display screen is absent of at least one link to at least one of the electronic resources whose associated markable region is unmarked.

BRIEF DESCRIPTION OF THE DRAWINGS

The invention is pointed out with particularity in the appended claims. However, other aspects of the present invention are disclosed in the following detailed description in conjunction with the accompanying drawings in which:

DETAILED DESCRIPTION OF A PREFERRED EMBODIMENT

Embodiments of the present invention advantageously provide methods and systems for navigating to a resource in an electronic network without requiring an end user to type its electronic address. Electronic network navigation data, such as URLs, are read from a member, such as the aforementioned address guide, using a data reader such as a page scanner. In addition, resources tagged by the end user for subsequent browsing can be automatically recognized using embodiments of the present invention.

Figure 1:
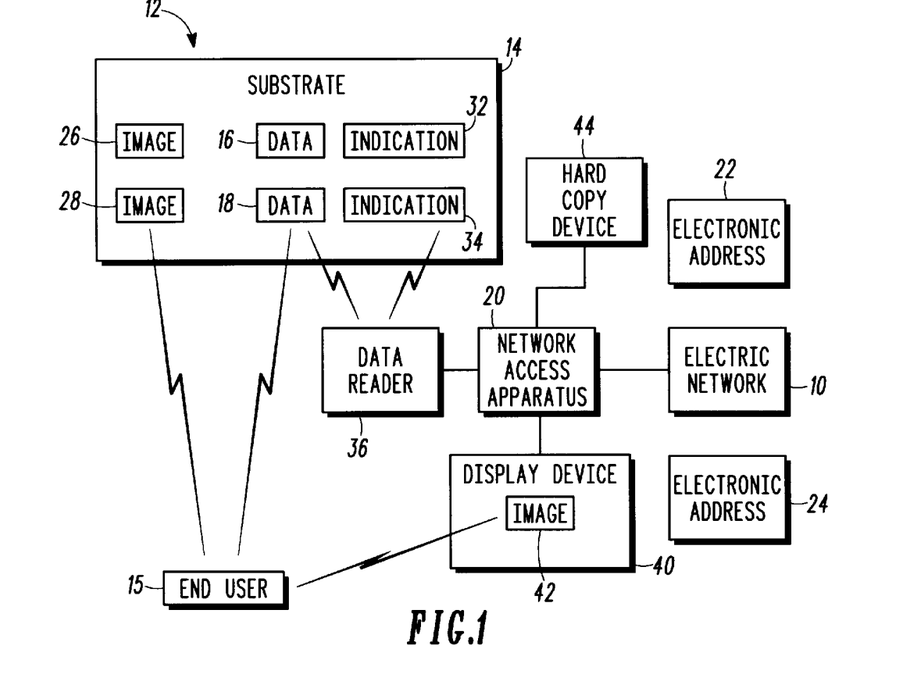
FIG. 1 is a block diagram of an embodiment of a system for linking to at least one resource in an electronic network.

FIG. 1 is a block diagram of an embodiment of a system for linking to at least one resource in an electronic network 10. The system includes a network navigation device 12 for navigating to the at least one resource. The network navigation device 12 comprises a substrate 14. Preferably, the substrate 14 is formed by a substantially flat piece of material. Examples of materials which can be utilized to form the substrate 14 include, but are not limited to, dielectric materials such as paper, cardboard, and plastic, and substantially nonmagnetic materials. If desired, the material and its thickness can be selected so that the substrate 14 is stiff, yet flexible. It is noted that, in general, the substrate 14 need not be homogeneous, i.e. more than two materials can be utilized to form the substrate 14.

It is also preferred that the substrate 14 be shaped and sized to facilitate ease in handling by individuals, such as an end user 15. For this purpose, the substrate 14 can be card-shaped. Here, for example, the substrate 14 can have the size of a business card, a credit card, an index card, a trading card (e.g. a baseball card), or a playing card (e.g. from a deck of playing cards).

In other preferred embodiments, the substrate 14 is shaped and sized as a sheet or a page. In these cases, the substrate 14 can comprise a standard-sized or a custom-sized sheet of printing material. Examples include, but are not limited to, letter-sized paper, legal-sized paper, A4-sized paper, and 11×17 inch paper. The substrate 14 can include a page in a book, a magazine, a newspaper, or other printed publication.

It is noted that embodiments of the present invention are not limited to the above-described shapes and sizes of the substrate 14. In general, the substrate 14 can have various shapes, such as rectangular, circular, oval, or polygonal shapes, and can have various sizes.

The substrate 14 supports first data item 16 and second data item 18. The first data item 16 provides one or more navigation instructions for linking a network access apparatus 20 to a first resource at a first electronic address 22. The second data item 18 provides one or more navigation instructions for linking the network access apparatus 20 to a second resource at a second electronic address 24. The network access apparatus 20 can be linked to the first resource or the second resource by the electronic network 10.

Of particular interest are embodiments of the present invention where the electronic network 10 includes the Internet, the World Wide Web, or an intranet. In these cases, each of the first data item 16 and the second data item 18 can include an electronic address to identify its corresponding resource, such as at least a portion of a URL or an IP (Internet Protocol) address. Alternatively, each of the first data item 16 and the second data item 18 can include a code by which a node in the electronic network 10 identifies its corresponding resource.

It is noted that a URL can includes up to four parts: a protocol, a domain name, a path, and a filename. URL protocols include: "file:" for accessing a file stored on a local storage medium; "ftp:" for accessing a file from an FTP (file transfer protocol) server; "http:" for accessing an HTML (hypertext marking language) document; "gopher:" for accessing a Gopher server; "mailto:" for sending an e-mail message; "news:" for linking to a Usenet newsgroup; "telnet": for opening a telnet session; and "wais:" for accessing a WAIS server. Consequently, the network navigation device 12 can be used for automatically initiating any of the above tasks.

Preferably, the first data item 16 and the second data item 18 are both machine-readable and human-readable. More preferably, each of the first data item 16 and the second data item 18 includes printed textual data for its corresponding electronic address, such as a printed URL or a printed IP address.

Alternatively, the first data item 16 and the second data item 18 can be machine-readable but practically indiscernible by most humans. In these embodiments, the first data item 16 and the second data item 18 each can include a bar code, such as a one-dimensional or a two-dimensional bar code, representative of the navigation instructions. Examples of one-dimensional bar codes include, but are not limited to, 3 of 9, UPC-A, Code 128, Codabar, MSI, Extended 3 of 9, Code 93, Extended Code 93, Industrial 2 of 5, Standard 2 of 5, Code 11, and UCC/EAN-128. Examples of two-dimensional bar codes include, but are not limited to, Data Matrix and PDF417.

As another alternative, the first data item 16 and the second data item 18 can be printed to be invisible to the end user 15 but readable by an optical reader. If desired, the first data item 16 and the second data item 18 can be selected to be readable by more than one type of data reader. For example, printed data can be printed with a magnetic substance, such as magnetic ink, so as to be readable by both an optical reader and a magnetic reader.

The first data item 16 and the second data item 18 can be supported by the substrate 14 in a variety of ways. In one embodiment, the first data item 16 and the second data item 18 are each printed directly onto the substrate 14. In another embodiment, at least one of the first data item 16 and the second data item 18 is printed onto a second substrate for affixing or adhering to a surface of the substrate 14. In this case, for example, the second substrate can have an adhesive backing for affixing the data to the substrate 14. In a further embodiment, at least one of the first data item 16 and the second data item 18 is printed to a member contained (e.g. sandwiched) within the substrate 14.

Optionally, the substrate 14 supports a first human-readable image 26 and a second human-readable image 28. The first human-readable image 26 is preferably indicative of the first resource. The second human-readable image 28 is preferably indicative of the second resource.

Each of the first human-readable image 26 and the second human-readable image 28 can include textual information and/or graphical information which provides an intuitive and/or understandable representation of its corresponding resource. As an example, to provide an association with the Motorola Web page on two-way pagers, a human-readable image can include textual information such as "Motorola" and/or "Two-Way Pagers", graphical information such as an image or an illustration of a Motorola two-way pager, or a combination of textual information and graphical information. Such a human-readable image is more intuitive and more understandable to the end user 15 than an electronic address having the form of http://www.mot.com/MIMS/MSPG/ Products/Two-way/tango/desc.html.

The first human-readable image 26 and the second human-readable image 28 can supported by the substrate 14 in a variety of ways. In one embodiment, the first human-readable image 26 and the second human-readable image 28 are printed directly onto the substrate 14. In another embodiment, at least one of the first human-readable image 26 and the second human-readable image 28 is printed onto a second substrate for affixing or adhering to a surface of the substrate 14. As another alternative, at least one of the first human-readable image 26 and the second human-readable image 28 is printed to a member contained within the substrate 14.

Optionally, the substrate 14 supports a first indication 32 and a second indication 34. The first indication 32 indicates whether or not the end user 15 has tagged the first resource for subsequent browsing. The second indication 34 indicates whether or not the end user 15 has tagged the second resource for subsequent browsing. To tag a resource for subsequent browsing, the end user 15 can mark or puncture a portion of the substrate 14 proximate to the image and/or the data for the resource. Preferably, a resource is tagged by filling a portion of the substrate 14 using a writing instrument such as a pen or a pencil.

The first data item 16, the second data item 18, and optionally, the first human-readable image 26, the second human-readable image 28, the first indication 32, and the second indication 34, are communicated to the network access apparatus 20 by a data reader 36. Preferably, the data reader 36 includes an optical imaging reader such as a page scanner, a photograph reader, a business card reader, a scanning wand, a reader in a fax machine, a linear CCD (charge coupled device) reader, or a two-dimensional CCD reader. The optical imaging reader generates an electronic image of printed information, namely, the data item 16 and 18, the images 26 and 28, and the indications 32 and 34, from the network navigation device 12. Alternatively, the data reader 36 can include a magnetic read head for reading magnetically-stored data.

A display device 40, such as a monitor or a television, is coupled to the network access apparatus 20 to display a list of at least one of the first resource and the second resource generated from the network navigation device 12. Preferably, the network access apparatus 20 generates the list based upon the electronic image formed by an optical imaging reader. The list can include the image and/or the data associated with both the first resource and the second resource, or can include information only for resources which are tagged.

The network access apparatus 20 receives a user-initiated selection of a resource from the list. In response to receiving the user-initiated selection, the network access apparatus 20 links to the resource. The network access apparatus 20 receives content from the resource, and displays at least a portion of the content on the display device 40. To reinforce an association between the network navigation device 12 and the resource, an image 42 viewable on the display device 40 upon linking to the resource is similar to (or can be equivalent to) at least a portion of its associated human-readable image.

It is noted that the network access apparatus 20 can have a variety of forms, including but not limited to, a general purpose computer, a network computer, a network television, an internet television, a portable wireless device, a television receiver, a game player, a video recorder, and an audio component.

Optionally, the network access apparatus 20 communicates with a hard copy device 44 to provide a hard copy representation of the content from the resource. The hard copy device 38 can have a variety of forms, including but not limited to, a printer, a laser printer, an ink jet printer, a thermal printer, a plotter, and a fax machine.

Figure 2:
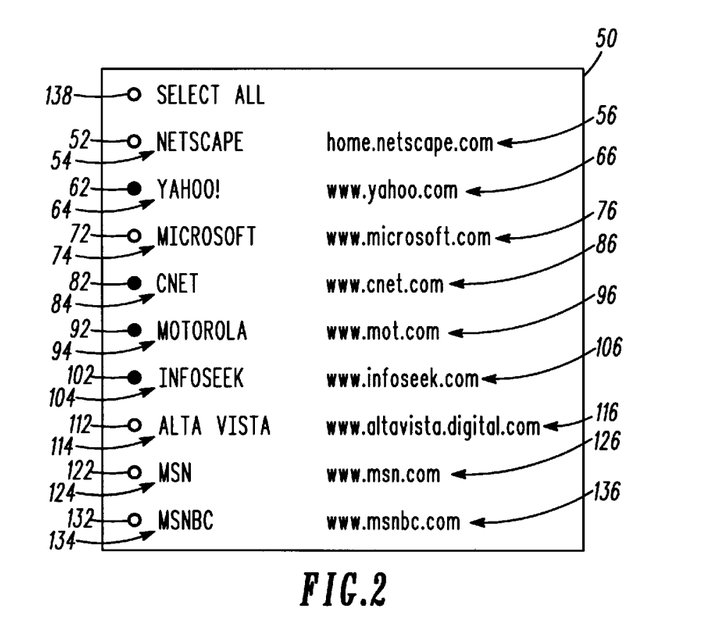
FIG. 2 is an illustration of an embodiment of a network navigation device.

FIG. 2 is an illustration of an embodiment of a network navigation device. The network navigation device includes a substrate 50 such as a sheet of paper, cardboard, or plastic. The substrate 50 supports printed data, a printed image, and an indication for each of a plurality of resources available on the Internet. An indication 52, a printed image 54 comprised of the word "Netscape", and printed data 56 comprising the URL "home.netscape.com" is associated with a resource at Netscape's Web site. An indication 62, a printed image 64 comprised of the word "Yahoo!", and printed data 66 comprising the URL "www.yahoo.com" is associated with a resource at the Yahoo Web site. An indication 72, a printed image 74 comprised of the word "Microsoft", and printed data 76 comprising the URL "www.microsoft.com" is associated with a resource at Microsoft's Web site. An indication 82, a printed image 84 comprised of the word "CNET", and printed data 86 comprising the URL "www.cnet.com" is associated with a resource at CNET's Web site. An indication 92, a printed image 94 comprised of the word "Motorola", and printed data 96 comprising the URL "www.mot.com" is associated with a resource at Motorola's Web site. An indication 102, a printed image 104 comprised of the word "Infoseek", and printed data 106 comprising the URL "www.infoseek.com" is associated with a resource at the Infoseek Web site. An indication 112, a printed image 114 comprised of the word "AltaVista", and printed data 116 comprising the URL "www.altavista.digital.com" is associated with a resource at the AltaVista Web site. An indication 122, a printed image 124 comprised of the word "MSN", and printed data 126 comprising the URL "www.msn.com" is associated with a resource at the Microsoft Network Web site. An indication 132, a printed image 134 comprised of the word "MSNBC", and printed data 136 comprising the URL "www.msnbc.com" is associated with a resource at MSNBC's Web site.

Each of the indications 52, 62, 72, 82, 92, 102, 112, 122, and 132 is contained within a corresponding border, such as a corresponding circular border as illustrated. It is noted, however, that other shaped borders can also be utilized to contain an indication.

An end user tags a resource for subsequent browsing by marking or filling within the border using a writing instrument such as a pencil or a pen. For example, the filled borders for the indications 62, 82, 92, and 102 indicate that the end user has tagged the Yahoo Web site, CNET's Web site, Motorola's Web site, and Infoseek's Web site for subsequent browsing. The absence of a mark within borders for the indications 52, 72, 112, 122, and 132 indicates that the end user is not presently interested in browsing Netscape's Web site, Microsoft's Web site, AltaVista's Web site, MSN's Web site, or MSNBC's Web site. The end user can base his/her decisions for tagging resources from reviews in a magazine such as *Yahoo! Internet Life*, or a directory.

Optionally, the substrate 50 supports an indication 138 to select all of the resources for tagging. The indication 138 is contained within a border as described for the other indications. The end user can make a mark within the border to tag all of the resources for subsequent browsing. This is advantageous in comparison to having to mark within each of the borders.

The use of printed images and printed data on a paper, cardboard or plastic substrate provides a number of advantages. A first advantage is that the resulting network navigation device can be produced inexpensively for wide distribution. For example, these network navigation devices can be: (i) included as inserts in magazines, newspapers, or other publications; (ii) stacked into decks and packaged for distribution by mail or for marketing in stores; and/or (iii) distributed as one distributes business cards. A second advantage is that a user can rapidly find network resources of interest by viewing the images on each network navigation device. In addition, the network navigation devices can be collected and traded in a manner similar to trading cards.

In addition, the use of a printed image and printed data allows for network navigation devices to be formed on pages of a book, magazine, newspaper, or other publication. Further, a plurality of pages of network navigation devices can be assembled to form a directory of resources for an electronic network. In general, each page can define a single network navigation device, or can define a plurality of network navigation devices. If desired, a page defining a plurality of network navigation devices can be perforated to allow for separation into individual network navigation devices.

Further, the use of printed images and printed data allows for network navigation devices to be formed on packages, boxes, containers, and the like. Here, for example, a network navigation can be formed on a surface of a cereal box.

Figure 3:
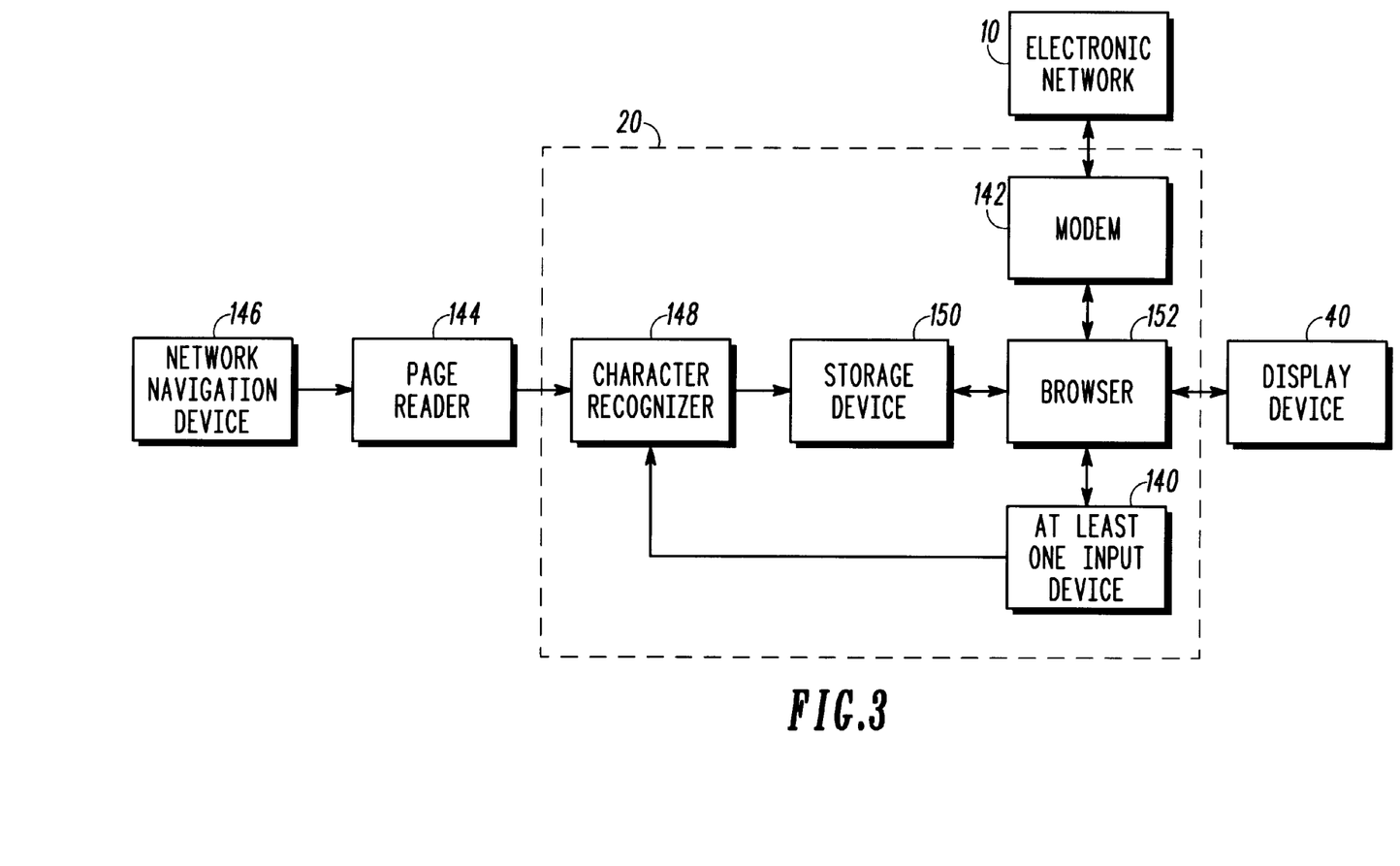
FIG. 3 is a block diagram of an embodiment of the network access apparatus in accordance with the present invention.

FIG. 3 is a block diagram of an embodiment of the network access apparatus 20 in accordance with the present invention. The network access apparatus 20, such as a personal computer, includes at least one input device 140 such as a keyboard and/or a pointing device (e.g. a mouse, a touchpad, a joystick, a trackball, or a pointing stick). The at least one input device 140 receives user-initiated actions and commands from the end user, and communicates signals representative thereof to the network access apparatus 20.

The network access apparatus 20 further includes a modem 142 or like transceiver to communicate with the electronic network 10. The modem 142 can communicate with the electronic network 10 via a line such as a telephone line, an ISDN line, a coaxial line, a cable television line, a fiber optic line, or a computer network line. Alternatively, the modem 142 can wirelessly communicate with the electronic network 10. The electronic network 10 can be provided by an online service, an Internet service provider, a local area network service, a wide area network service, a cable television service, a wireless data service, an intranet, a satellite service, or the like.

The network access apparatus 20 communicates with a page reader 144 such as a page scanner, a photograph scanner, or a card scanner. The page reader 144 reads printed information from a network navigation device 146 such as the network navigation devices described with reference to FIG. 1 and FIG. 2. The printed information includes printed data, printed images, and indicators for at least one resource available via the electronic network 10.

The page reader 144 communicates a signal representative of the printed information to the network access apparatus 20. The network access apparatus 20 includes a character recognizer 148 to recognize characters included in the printed data and the printed images. The character recognizer 148 can include a processor which executes a commercially-available optical character recognition (OCR) software package.

The character recognizer 148 communicates textual information and images to a storage device 150. The storage device 150 maintains a data structure of a list of resources to subsequently browse. The storage device 150 can include a memory such as a random access memory (RAM), a diskette, a hard disk, a PCMCIA memory card, or any other computer-readable storage medium. Preferably, the list of resources is stored as a file on the storage medium 150, such as a file on a hard disk.

The network access apparatus 20 provides a browser 152 for browsing resources available from the electronic network 10. The browser 152 can include a processor which executes a commerciallyavailable client software package such as Netscape Navigator, Microsoft's Internet Explorer, or Mosaic. The browser 152 accesses the list of resources stored by the storage device 150, and commands the display device 40 to display at least a portion thereof. The end user selects a resource from the list using the at least one input device 140. The at least one input device 140 communicates a signal associated with the user-initiated selection to the browser 152. In response thereto, the browser 152 communicates a signal to the modem 142 to link to the selected resource. Thereafter, content from the resource is communicated to the modem 142 via the electronic network 10. The content is displayed by the display device 40.

Figure 4:
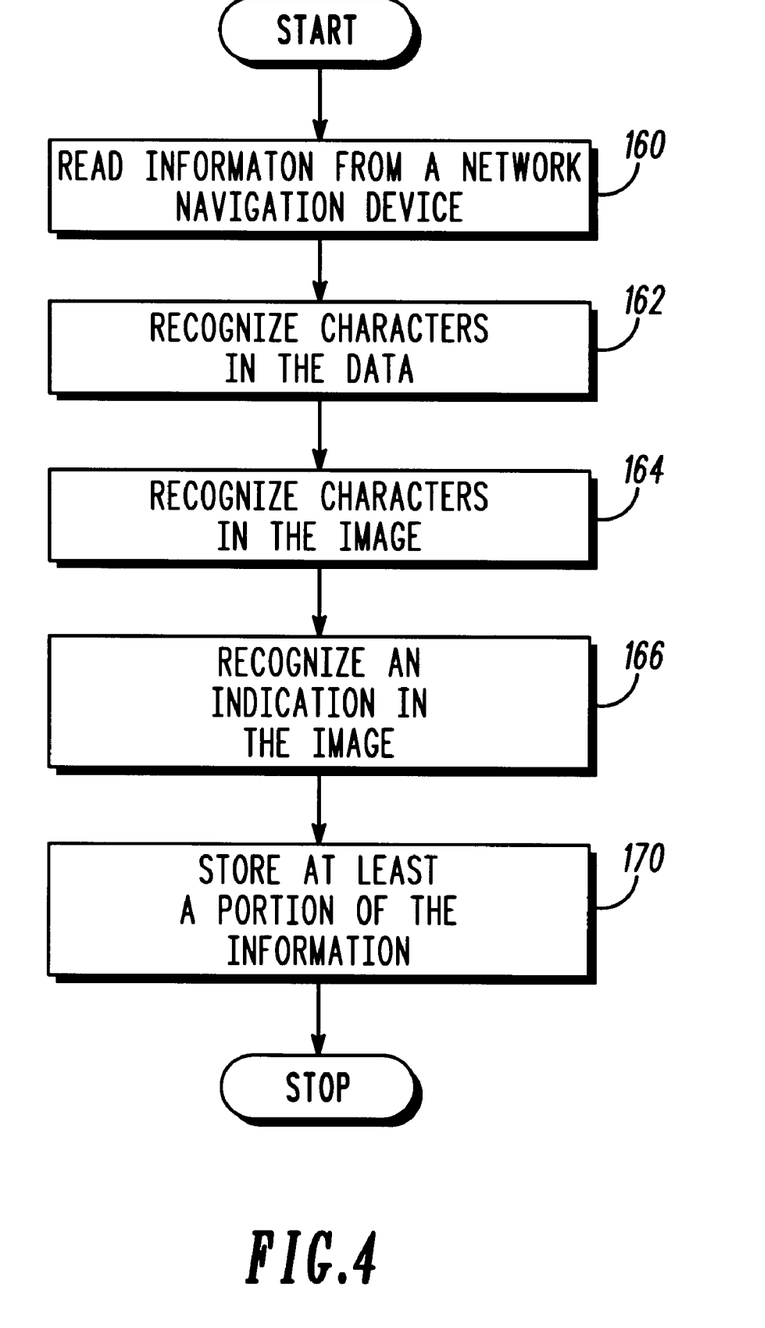
FIG. 4 is a flow chart of an embodiment of a method of reading information from a network navigation device.

FIG. 4 is a flow chart of an embodiment of a method of reading information from a network navigation device. The method can be performed by elements described with reference to FIG. 1 or FIG. 3. The network navigation device can include the network navigation device 12 described with reference to FIG. 1 or the network navigation device described with reference to FIG. 2.

As indicated by block 160, the method includes a step of reading information from the network navigation device. Preferably, the step of reading information includes reading printed information using the data reader 36 described with reference to FIG. 1 or page reader 144 described with reference to FIG. 3. The step of reading information can include reading data for each of at least one resource, and optionally, reading an image and an indication for each of the at least one resource.

Preferably, this step includes reading data, an image, and an indication for each of a plurality of resources by imaging the network navigation device with the data reader 36 or the page reader 144. For example, using the network navigation device illustrated in FIG. 2 and the page reader 144, the step of reading information can result in an electronic image of printed information supported by the network navigation device.

As indicated by block 162, the method includes A-a step of recognizing characters in the data for at least one of the resources. Preferably, the characters in the data are recognized from the electronic image produced in the step indicated by block 160. By recognizing the characters, textual data representative of a navigation instruction is formed for each of at least one resource. Preferably, the textual data is representative of at least a portion of a URL or an IP address for each resource. For example, using the network navigation device described with reference to FIG. 2, the step of recognizing characters in the data results in recognizing textual data representative of "home.netscape.com", "www.yahoo.com", "www.microsoft.com", "www.cnet.com", "www.mot.com", "www.infoseek.com", "www.altavista.digital.com", "www.msn.com", and "www.msnbc.com".

As indicated by block 164, the method includes an optional step of recognizing characters in the image for at least one of the resources. Preferably, the characters in each image are recognized from the electronic image produced in the step indicated by block 160. By recognizing the characters in each image, textual data representative of the image is formed for each of at least one resource. For example, using the network navigation device described with reference to FIG. 2, the step of recognizing characters in each image results in recognizing textual data representative of "Netscape", "Yahoo!", "Microsoft", "CNET", "Motorola", "Infoseek", "AltaVista", "MSN", and "MSNBC".

As indicated by block 166, the method includes a step of recognizing an indication. This step can include recognizing an indication to select all of the resources, and/or recognizing an indication for each of at least one of the resources. Preferably, each indication is recognized from the electronic image produced in the step indicated by block 160. Further, it is preferred that the indication be recognized by recognizing the absence or the presence of a mark in within a predetermined boundary. The presence of the mark indicates that its associated resource is tagged for subsequent browsing. The absence of a mark indicates that its associated resource is not tagged. Using the network navigation device described with reference to FIG. 2, the step of recognizing each indication results in data indicating that Netscape is untagged, Yahoo is tagged, Microsoft is untagged, CNET is tagged, Motorola is tagged, Infoseek tagged, AltaVista is untagged, MSN is untagged, and MSNBC is untagged.

As indicated by block 170, the method includes a step of storing at least a portion of the information formed by the previous steps. The information is stored by the storage device 150 described with reference to FIG. 3. This step can include storing information for each of the resources, or alternatively, storing information only for resources which are tagged. Information for each of the resources can be stored in response to: (i) recognizing an indication to select all of the resources; (ii) recognizing a tag indication for each of the resources; or (iii) recognizing an untagged indication for each of the resources.

The information which is stored can include textual data representative of a navigation instruction for the resource, and optionally, data representative of an image associated with the resource. The data representative of the image can include textual data formed by the step indicated by block 164 and/or a pixel representation of the image.

Preferably, textual data representative of an electronic address and an image for each tagged resource are stored as a list in a file using the storage device 150. If the file contains previously-stored information for other resources, the information is inserted, appended, or prepended to the previously-stored information.

An article of manufacture can be formed to direct the network access apparatus to perform the above-described steps. The article of manufacture can include a computer-readable storage medium having computer-readable data stored therein which directs the network access apparatus to perform the above-described steps. Examples of the computer-readable storage medium include, but are not limited to, a logic circuit, a memory, a mass storage medium, an optical disk, a CD-ROM, a magnetic disk, a floppy disk, a hard disk, and a PCMCIA card.

Figure 5:
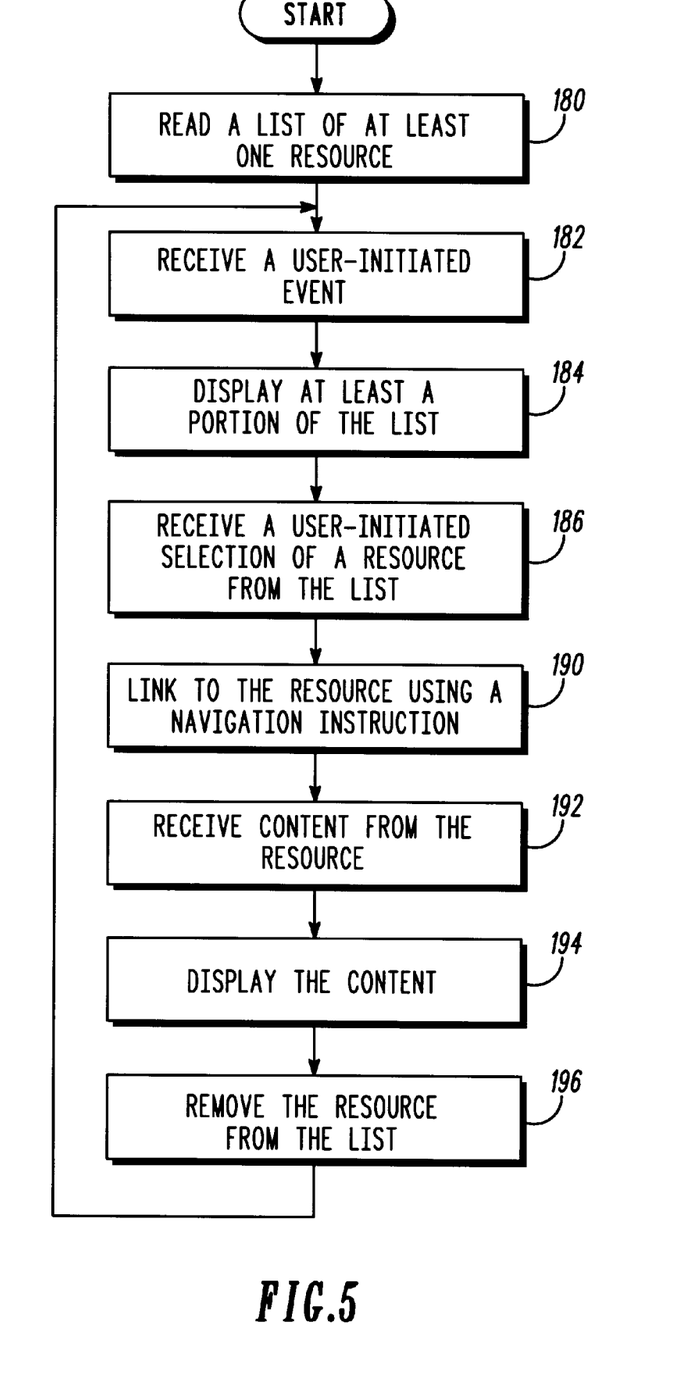
FIG. 5 is a flow chart of an embodiment of a method of navigating to at least one resource in accordance with the present invention.

FIG. 5 is a flow chart of an embodiment of a method of navigating to at least one resource in accordance with the present invention. As indicated by block 180, the method includes a step of reading a list of at least one resource in the electronic network. The step of reading the list can include the steps described with reference to FIG. 4. In a first preferred embodiment, the step of reading the list includes receiving an electronic image of a page of printed information, and generating the list based upon the electronic image. In this case, it is also preferred that the step of generating the list includes recognizing textual data in the electronic image. The textual data can include a navigation instruction such as an electronic address for each resource.

In a second preferred embodiment, the step of reading the list includes reading the list from the storage device 150. Preferably, this step includes reading a file containing the list from the storage device 150. The list can be read upon initiation of a browser routine performed by the browser 152.

As indicated by block 182, the method includes a step of receiving a user-initiated event to display at least a portion of the list. The user-initiated event can include an event received by the at least one input device 140 such as one or more keystrokes received by a keyboard, or a point command and/or a click command received by a pointing device.

As indicated by block 184, the method includes a step of displaying at least a portion of the list in response to receiving the user-initiated event. Preferably, this step includes displaying the image associated with each resource in the list. Optionally, this step can include displaying the textual data representative of the navigation instruction for each resource in the list. In this case, an electronic address such as a portion of a URL or an IP address can be displayed with each image.

As indicated by block 186, the method includes a step of receiving a user-initiated selection of a resource from the list. The user-initiated selection can include a selection received by the at least one input device 140, such as one or more keystrokes received by a keyboard, or a point command and/or a click command received by a pointing device. This step can include receiving a user-initiated selection of an image associated with the resource.

As indicated by block 190, the method includes a step of linking to the resource using a navigation instruction associated therewith in the list. This step typically includes transmitting the navigation instruction to the electronic network 20 to establish the link to the resource. As stated earlier, the navigation instruction can include at least a portion of a URL or at least a portion of an IP address for the resource. If the navigation instruction includes a partial address, an additional step of completing the electronic address can be performed. For example, if an IP address is received, the IP address can be prepended by "http://".

As indicated by block 192, the method includes a step of receiving content from the resource once the link is established. The content from the resource can include audible information and/or visual information, such as graphical information and/or textual information. Examples of the content include, but are not limited to, any combination of a file from a local hard drive, a file from a FTP server, an HTML document, content from a Gopher server, a message from a newsgroup, a transmission from a Telnet session, a transmission from a WAIS server, an animation file, a movie file, an audio file, downloadable software, and an electronic book file.

As indicated by block 194, the method includes a step of displaying the content from the resource. The content can be displayed on the display device 40 or the hard copy device. As described earlier, the content can include an image which corresponds to at least a portion of the image on the network navigation device.

As indicated by block 196, the method includes a step of removing the resource from the list. It is noted that this step can be performed at any time after receiving the user-initiated selection in block 186. The step of removing the resource from the list can include deleting an entry for the resource, or writing a file to the storage device 150 in which the entry for the resource is removed. Thereafter, flow of the method is directed back to block 182 so that the end user can navigate to another resource from the list.

An article of manufacture can be formed to direct the network access apparatus to perform the above-described steps. The article of manufacture can include a computer-readable storage medium having computer-readable data stored therein which directs the network access apparatus to perform the above-described steps. Examples of the computer-readable storage medium include, but are not limited to, a logic circuit, a memory, a mass storage medium, an optical disk, a CD-ROM, a magnetic disk, a floppy disk, a hard disk, and a PCMCIA card.

Figure 6:
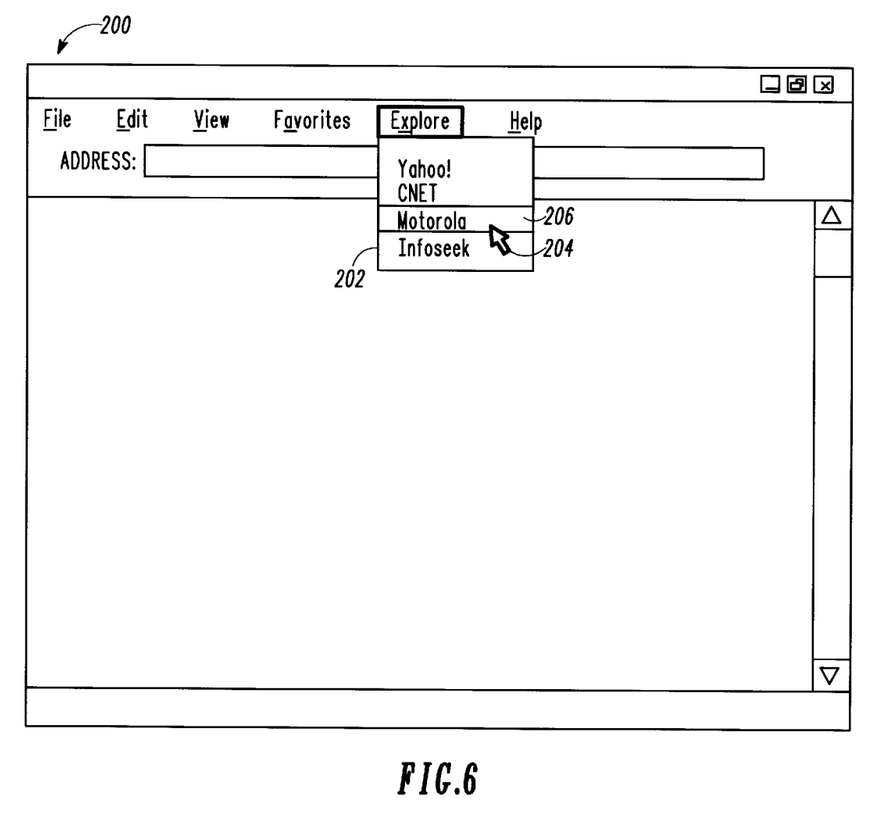
FIG. 6 is an illustration of a first display screen of an embodiment of a browser in accordance with the present invention.

FIG. 6 is an illustration of a first display screen of an embodiment of a browser in accordance with the present invention. The display screen includes a menu bar 200 for displaying any one of a plurality of menus. The menus include a menu 202 for displaying the list of resources in the file. The menu bar 200 further provides access to other browsing menus including but not limited to a file menu, an edit menu, a favorites menu or a bookmark menu, and a help menu.

The menu 202 can be displayed in response to the end user pointing a cursor 204 to a hot spot 206 using a pointing device. Alternatively, the menu 202 can be displayed in response to the end user enter-ing a keyboard shortcut for the menu name. For example, the menu 202 can be named as an "explore menu" or a "to explore menu" having a keyboard shortcut of ALT-x. As another alternative, the menu 202 can be displayed in response to receiving a click operation by a pointing device, such as from a right click button on a mouse.

The menu 202 includes an image associated with each of the resources in the list. In this example, the menu 202 includes textual information ("Yahoo!", "CNET", "Motorola", and "Infoseek") corresponding to the tagged resources of the network navigation device described with reference to FIG. 2.

A resource from the list can selected by pointing to and clicking on an image associated therewith. As illustrated, the end user is pointing to the image of "Motorola" using the cursor 204. By clicking on the image of "Motorola", a user-initiated selection of a resource at the Motorola Web site is generated. Alternatively, a resource from the list can be selected by one or more keystrokes using an uparrow key and/or a down-arrow key followed by an enter key.

Figure 7:
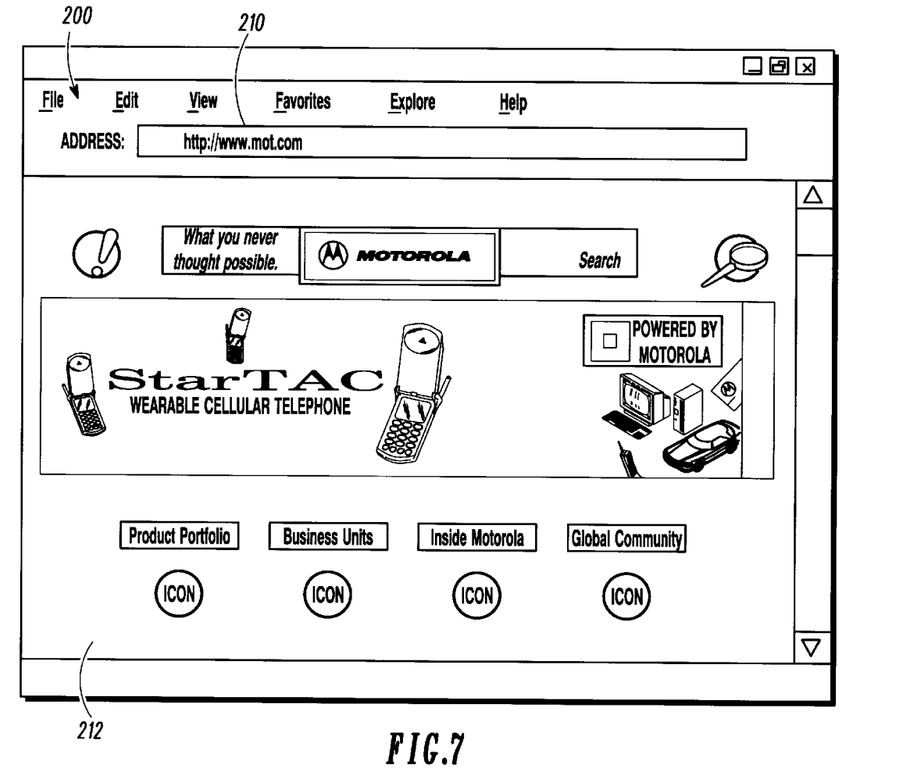
FIG. 7 is an illustration of a second display screen of an embodiment of a browser in accordance with the present invention.

FIG. 7 is an illustration of a second display screen of an embodiment of a browser in accordance with the present invention. The second display screen is displayed upon receiving a user-initiated selection of a resource, such as the selection of "Motorola" described with reference to FIG. 6.

The second display screen includes a location bar 210 which displays the electronic address of the selected resource. In this example, the electronic address of Motorola's Web site, namely "http://www.mot.com", is displayed.

Upon linking to the resource and receiving content from the resource, the content is displayed in a display portion 212 of the second display screen. In this example, at least a portion of the content of Motorola's Web site is displayed in the display portion 212.

Figure 8:
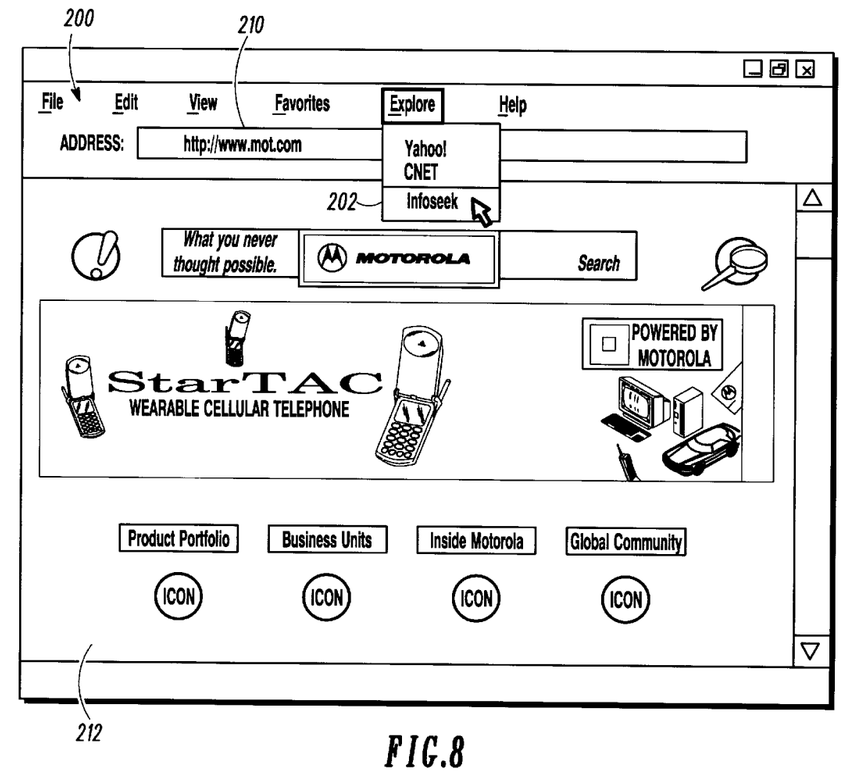
FIG. 8 is an illustration of a third display screen of an embodiment of a browser in accordance with the present invention.

FIG. 8 is an illustration of a third display screen of an embodiment of a browser in accordance with the present invention. The third display screen depicts the menu 202 being displayed after linking to Motorola's Web site. As illustrated, the list has been modified to remove the entry for Motorola. At this point, the end user can select either Yahoo, CNET, or Infoseek to browse.

It is noted that embodiments of the present invention can be advantageously utilized for any electronic network having an electronic addressing scheme for identifying servers and information contained therein.

It is further noted that alternative embodiments of network navigation devices which include teachings from the listed incorporated-byreference applications are also contemplated. Also, alternative embodiments of the network access apparatus and the data readers which include teachings from the listed incorporated-byreference applications are contemplated.

Thus, there has been described herein several embodiments including preferred embodiments of a method, system, and article of manufacture for navigating to a resource in an electronic network.

Because the various embodiments of the present invention read a navigation instruction from a network navigation device using a data reader, they provide a significant improvement in that an end user can navigate to a resource of interest without having to type the navigation instruction.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. An electronic network navigation method comprising the stps of:

forming an electronic image of an object having a plurality of markable regions associated with a plurality of electronic resources;

processing the electronic image to detect which of the markable regions associated with the plurality of electronic resources is marked and which of the markable regions associated with the plurality of electronic resources is unmarked;

generating a list comprising at least one link to at least one of the electronic resources whose associated markable region is marked, the list absent of at least one link to at least one of the electronic resources whose associated markable region is unmarked; and displaying a display screen based upon the list.

2. The electronic network navigation method of claim 1 wherein the object comprises a single sheet.

3. An electronic network navigation apparatus comprising:

an optical imaging reader to form an electronic image of an object having a plurality of markable regions associated with a plurality of electronic resources;

a processor to process the electronic image to detect which of the markable regions associated with the plurality of electronic resources is marked and which of the markable regions associated with the plurality of electronic resources is unmarked; and a display device operatively associated with the processor to display a display screen comprising at least one link to at least one of the electronic resources whose associated markable region is marked, the display screen absent of at least one link to at least one of the electronic resources whose associated markable region is unmarked.

4. The electronic network navigation apparatus of claim 3 wherein the object comprises a single sheet, and wherein the optical imaging reader comprises a page scanner.

5. An article of manufacture comprising:

a computer-readable storage medium; and computer-readable data stored by the computer-readable storage medium, the computer-readable data to direct an electronic network navigation apparatus to:

form an electronic image of an object having a plurality of markable regions associated with a plurality of electronic resources;

process the electronic image to detect which of the markable regions associated with the plurality the of electronic resources is marked and which of the markable regions associated with the plurality of electronic resources is unmarked; and display a display screen comprising at least one link to at least one of the electronic resources whose associated markable region is marked, the display screen absent of at least one link to at least one of the electronic resources whose associated markable region is unmarked.

6. The article of manufacture of claim 5 wherein the object comprises a single sheet.

7. An electronic network navigation method comprising the steps of:

reading a first indication item and a second indication item from an object having a first human-viewable item indicative of a first electronic resource and a second human-viewable item indicative of a second electronic resource;

determining that the first indication item indicates that the first human-viewable item indicative of the first electronic resource is tagged;

determining that the second indication item indicates that the second human-viewable item indicative of the second electronic resource is tagged; and displaying a display screen comprising a first link to the first electronic resource, the display screen absent of a second link to the second electronic resource based upon the second indication item indicating that the second human-viewable item indicative of the second electronic resource is untagged.

8. The electronic network navigation method of claim 7 wherein the first indication item comprises a mark within a first region of the object, and wherein the second indication item comprises an unmarked second region of the object.

9. The electronic network navigation method of claim 8 wherein the mark comprises a written mark.

10. The electronic network navigation method of claim 8 wherein the first region is defined by a first printed border and the second region is defined by a second printed border.

11. The electronic network navigation method of claim 7 wherein the object comprises a single sheet.

12. An electronic network navigation apparatus comprising:

an optical imaging reader to read a first indication item and a second indication item from an object having a first human-viewable item indicative of a first electronic resource and a second human-viewable item indicative of a second electronic resource;

a processor responsive to the optical imaging reader to determine that the first indication item is indicative of the first human-viewable item indicative of the first electronic resource being tagged and that the second indication item is indicative of the second human-viewable item indicative of the second electronic resource being untagged; and a display device responsive to the processor to provide a display screen comprising a first link to the first electronic resource, the display screen absent of a second link to the second electronic resource based upon the second indication item indicating that the second human-viewable item indicative of the second electronic recourse is untagged.

13. The electronic network navigation apparatus of claim 12 wherein the first indication item comprises a mark within a first region of the object, and wherein the second indication item comprises an unmarked second region of the object.

14. The electronic network navigation apparatus of claim 13 wherein the mark comprises a written mark.

15. The electronic network navigation apparatus of claim 13 wherein the first region is defined by a first printed border and the second region is defined by a second printed border.

16. The electronic network navigation apparatus of claim 12 wherein the optical imaging reader comprises a page scanner, and wherein the object comprises a single page.

17. An article of manufacture comprising:

a computer-readable storage medium; and computer-readable data stored by the computer-readable storage medium, the computer-readable data to direct a network navigation apparatus to:

read a first indication item and a second indication item from an object having a first human-viewable item indicative of a first electronic resource and a second human-viewable item indicative of a second electronic resource;

determine that the first indication item indicates that the first human-viewable item indicate of the first electronic resource is tagged;

determine that the second indication item indicates that the second human-viewable item indicative of the second electronic resource is untagged; and display a display screen comprising a first link to the first electronic resource, the display screen absent of a second link to the second electronic resource based upon the second indication item indicating that the second human-viewable item indicative of the second electronic resource is untagged.

18. The article of manufacture of claim 17 wherein the first indication item comprises a mark within a first region of the object, and wherein the second indication item comprises an unmarked second region of the object.

19. The article of manufacture of claim 18 wherein the mark comprises a written mark.

20. The article of manufacture of claim 18 wherein the first region is defined by a first printed border and the second region is defined by a second printed border.

21. The article of manufacture of claim 17 wherein the object comprises a single sheet.

* * * * *

UNITED STATES PATENT AND TRADEMARK OFFICE
CERTIFICATE OF CORRECTION

PATENT NO. : 5,903,729
DATED : May 11, 1999
INVENTOR(S) : Reber et al.

It is certified that error appears in the above-indentified patent and that said Letters Patent is hereby corrected as shown below:

Column 12, line 61 reads "stps" should be --steps--.

Column 13, line 65 reads "tagged" should be --untagged--

Signed and Sealed this

Nineteenth Day of October, 1999

Attest:

Q. TODD DICKINSON

Attesting Officer

Acting Commissioner of Patents and Trademarks